E. SHANTZ.
BUTTON MAKING MACHINE.
APPLICATION FILED JAN. 4, 1907.

1,107,629.

Patented Aug. 18, 1914.
5 SHEETS—SHEET 1.

WITNESSES:
Chas. H. Young.
Sidney H. Abbott

INVENTOR
Edgar Shantz
BY
Arthur E. Parsons
ATTORNEY

E. SHANTZ.
BUTTON MAKING MACHINE.
APPLICATION FILED JAN. 4, 1907.

1,107,629.

Patented Aug. 18, 1914.

5 SHEETS—SHEET 3.

WITNESSES:
Chas. H. Young.
Sidney H. Abbott.

INVENTOR
Edgar Shantz
BY
Arthur E. Parsons
ATTORNEY

THE NORRIS PETERS CO., PHOTO-LITHO., WASHINGTON, D. C.

E. SHANTZ.
BUTTON MAKING MACHINE.
APPLICATION FILED JAN. 4, 1907.

1,107,629.

Patented Aug. 18, 1914.
5 SHEETS—SHEET 4.

WITNESSES:
Chas. H. Young
Sidney H. Abbott

INVENTOR
Edgar Shantz
BY
Arthur C. Parsons
ATTORNEY

E. SHANTZ.
BUTTON MAKING MACHINE.
APPLICATION FILED JAN. 4, 1907.

1,107,629.

Patented Aug. 18, 1914.

5 SHEETS—SHEET 5.

WITNESSES:
Chas H. Young
Sidney H. Abbott

INVENTOR
Edgar Shantz
BY
Arthur E. Parsons
ATTORNEY

UNITED STATES PATENT OFFICE.

EDGAR SHANTZ, OF ROCHESTER, NEW YORK.

BUTTON-MAKING MACHINE.

1,107,629.   Specification of Letters Patent.   Patented Aug. 18, 1914.

Application filed January 4, 1907. Serial No. 350,722.

*To all whom it may concern:*

Be it known that I, EDGAR SHANTZ, of Rochester, in the county of Monroe and State of New York, have invented a certain new and useful Button-Making Machine, of which the following is a specification.

My invention has for its object the production of a button-making machine, which is particularly simple in construction, and highly efficient in use; and to this end it consists in the novel combinations and constructions hereinafter set forth and claimed.

In describing this invention, reference is had to the accompanying drawing in which like characters designate corresponding parts in all the views.

Figure 1:
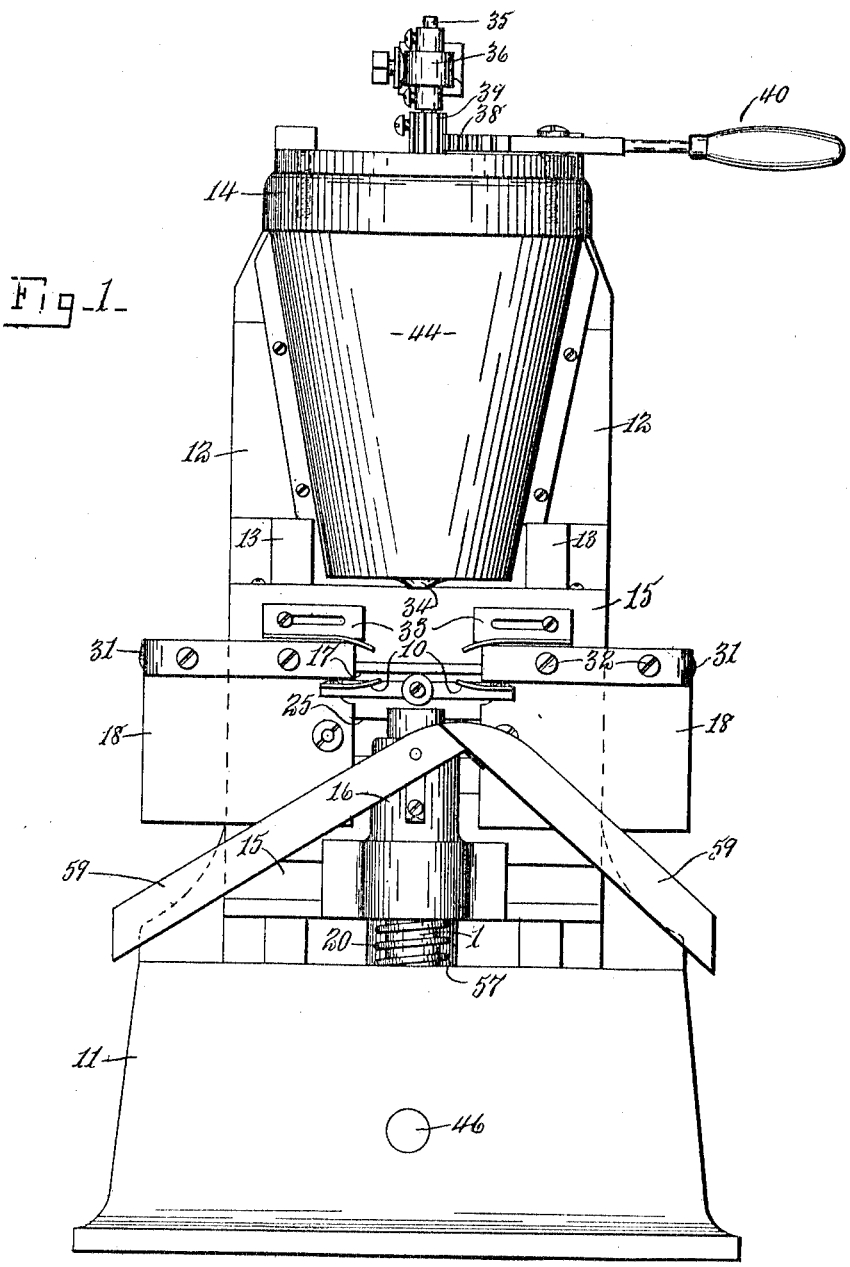
Figure 2:
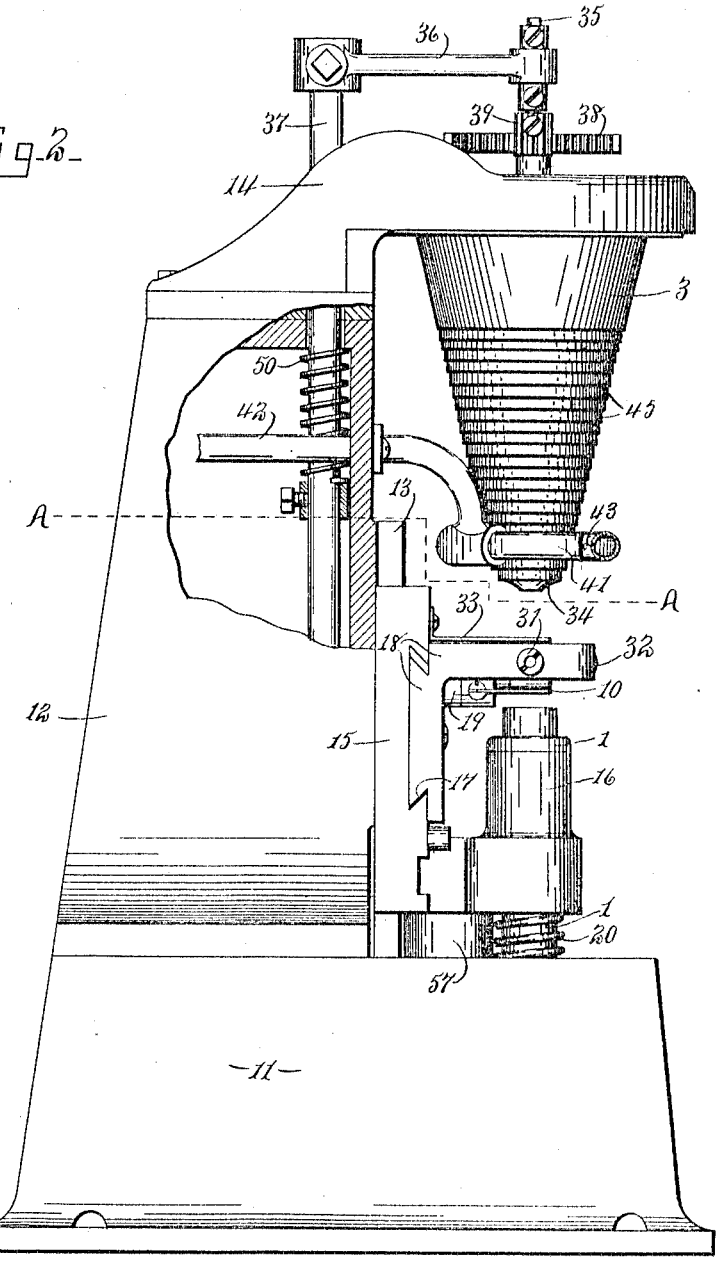
Figure 3:
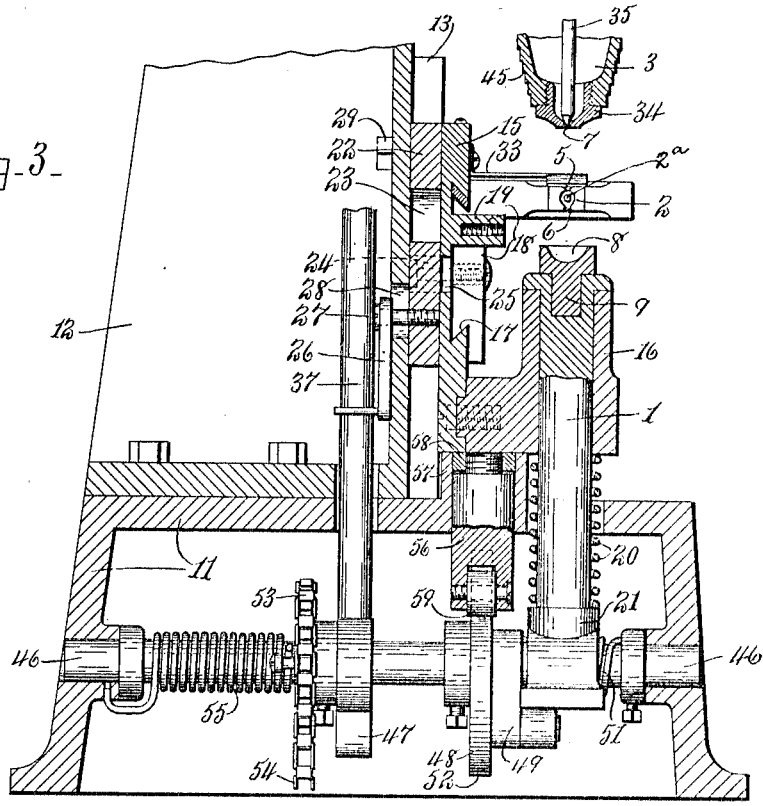
Figure 8:
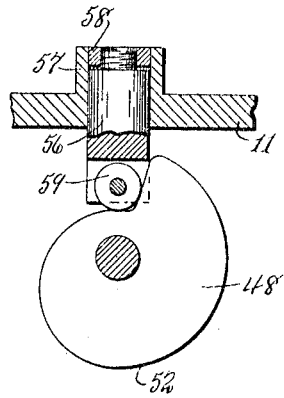
Figure 4:
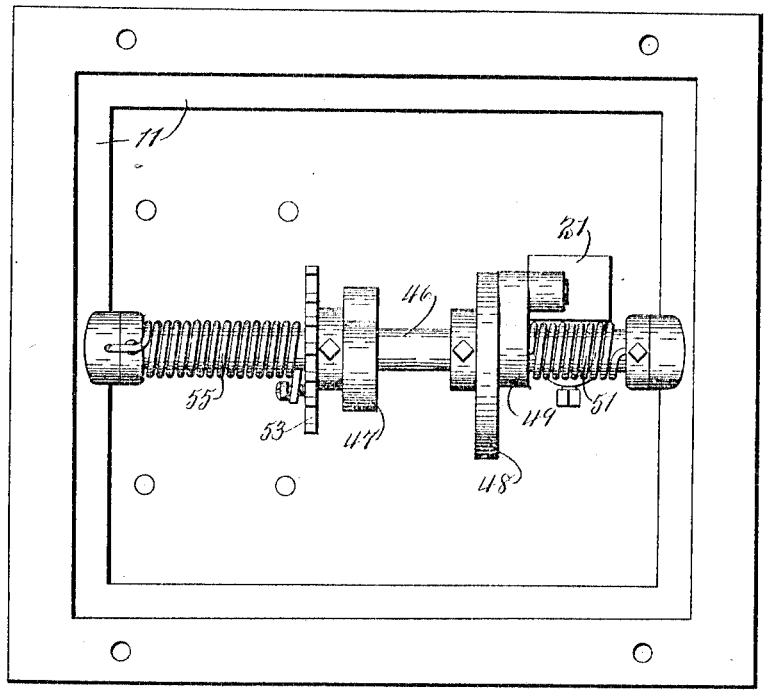
Figure 9:
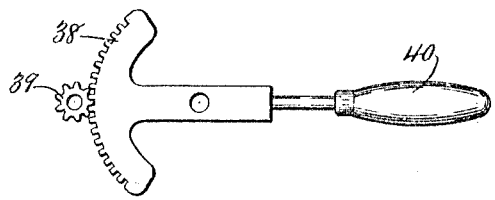
Figure 10:
Figure 5:
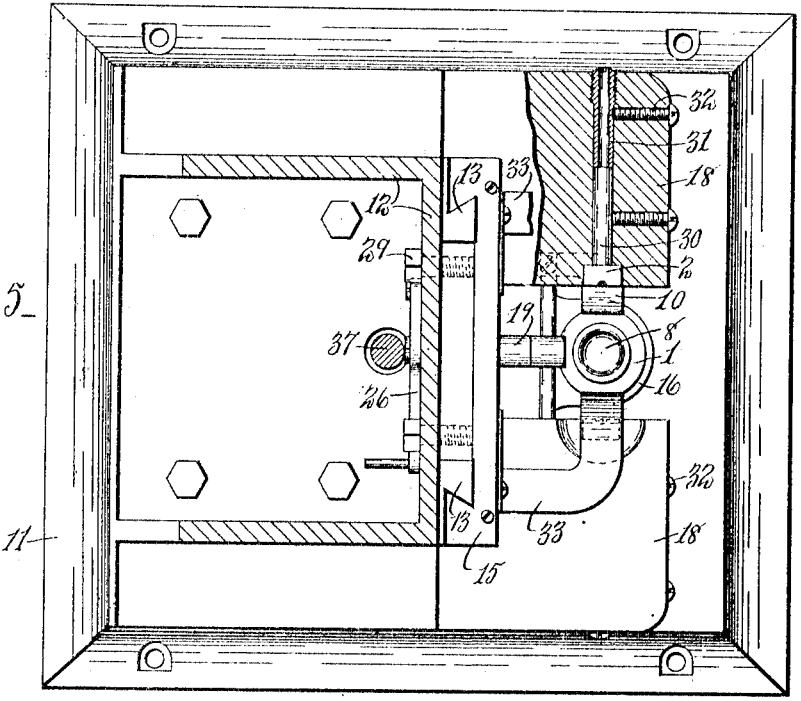
Figure 6:
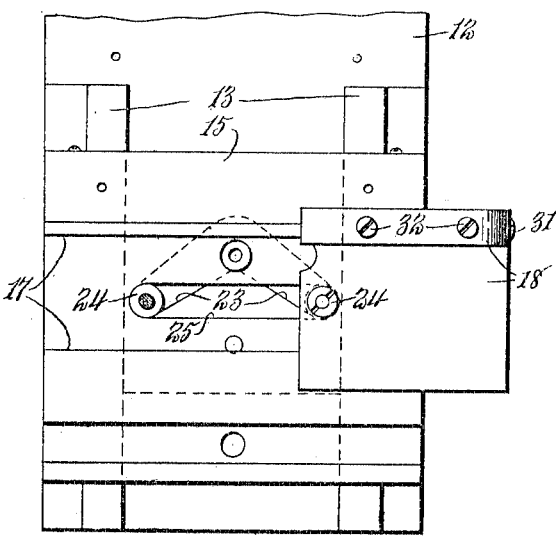
Figure 7:
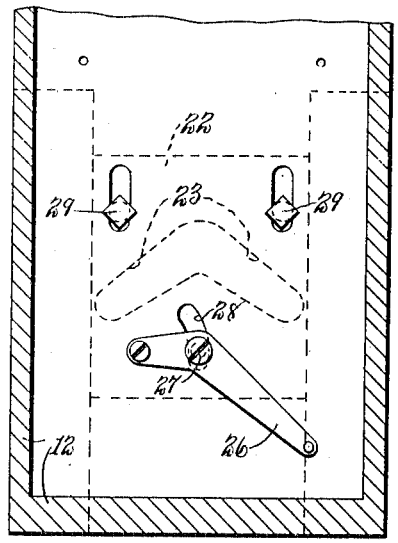

Figure 1 is a front elevation of a preferable embodiment of my button-making machine. Fig. 2 is a side elevation thereof, partly broken away, the jacket of the reservoir being removed. Fig. 3 is a vertical sectional view of my machine, the upper portion thereof being broken away. Fig. 4 is an inverted view of the base of the machine showing the actuating means. Fig. 5 is a transverse sectional view on line A—A, Fig. 2, one of the slides and mold-sections supported thereby being partly in section. Fig. 6 is an elevation of the front face of the upright portion of the frame of my machine, the carriage and one of the slides which supports a mold-section being shown, and the plate for effecting the movement of the slides being illustrated in dotted lines. Fig. 7 is a rear elevation, partly in section, of the portion of the frame seen in Fig. 6 showing the means for adjusting the plate for effecting the movement of said slides. Fig. 8 is a detail view of the cam for actuating the carriage, and adjacent parts. Fig. 9 is a detail view showing the means for changing the position of the plunger which opens and closes the exit port of the reservoir. Fig. 10 is a sectional view, partly in elevation, of a button produced by my machine.

The invention includes, generally, a reservoir 3 for holding a supply of molten metal and provided with a valve-controlled outlet through which the metal discharges by gravity, a mold 2 operating in a zone below the reservoir outlet and provided with a mold cavity having continuations, or ports, opening out through upper and lower faces thereof, and a support 1, located below the mold and movable toward and from the same for pressing a button blank against the under face of the mold so that a recess 4, opening out through the under face of the blank, will be registered with the part of the mold cavity opening out through the lower face of the mold, whereby during the casting operation this recess will form substantially an uninterrupted continuation of the mold cavity.

The invention includes further a mold formed of two sections and means for automatically moving the sections generally in opposite directions so as to open and close the mold and move the same into and out of registration with the reservoir, and means for operating in regular sequence therewith the valve of the reservoir and the button-blank support.

As illustrated, the support 1 for the button-head, and the mold 2 are movable as one body relatively to the reservoir 3, and the support is movable relatively to the mold, the mold being interposed between the reservoir and the support 1 and normally spaced apart therefrom. Said mold is formed with inlet and exit orifices 5 and 6 on opposite sides thereof, serving to register, respectively, with the exit port 7 of the reservoir and the recess 4 of the button-head on the support, and being normally out of registration therewith.

As will be understood by those skilled in the metal casting art, the shape of the shank will conform to the contour of the mold cavity, which may be of any desired shape. In the particular dies, or molds, illustrated in the drawings, the mold cavity is of substantially ring shape and is provided at opposite sides thereof with radial continuations, or ports 5 and 6, leading through the upper and lower faces of the mold, respectively. This form of cavity will provide a shank having a transverse opening, or eye. As will be obvious, however, should it be desired to cast a non-eyeleted shank, the central projection, or core $2^a$, would be eliminated, and if it were desired to cast a cyclical shank, the cavity in each die section would be made semi-cylindrical. The particular shape of the mold cavity has no effect upon the operation of the machine or parts thereof.

Preferably, the support for the button-head and the mold are movable vertically, the mold being arranged above the support and the reservoir above the mold, so that the molten material may feed by gravity from the reservoir into and through the mold, and into the recess of the button-head. Said support 1 is provided with suitable means for frictionally holding the button-head with its recess presented outwardly so that when a shank has been cast thereon the movement of the support from the mold will remove the button-head with shank attached from the support, said means being formed with a socket 8 for receiving the button-head, and with a stud 9 for entering an opening provided in the main body of the support 1. Preferably the mold 2 is composed of two sections which are movable toward each other as they are carried upwardly toward the reservoir, and away from each other as they are moved away from the reservoir after the casting operation, by means hereinafter described. Strippers 10 are provided for detaching the shank with button-head attached from the mold after the sections of the mold have been separated.

In the illustrated embodiment of this invention, the support for the button-head, the mold and reservoir are supported by a frame comprising a hollow base 11, a hollow upright, or standard 12 rising from the rear portion of the base and formed with a guide consisting of ways 13 spaced apart on its front face, and a bracket 14 fixed to the upper end of the standard 12 and overhanging the front portion of the base; and the mold-sections and the support for the button-head are supported by a carriage 15 movable along the vertical guide or ways 13, and the reservoir depends from the overhanging bracket. Said carriage is formed with a vertical tubular guide 16 in which the support 1 for the button-head is movable, and with transverse horizontal ways 17 in which slides 18, which support the mold-sections, are movable, and also with a boss 19 to which the strippers 10 are attached. The support 1 projects through the top of the base 11, and is held in its starting position by a spring 20 encircling the lower portion thereof and bearing against the lower face of the carriage and a foot 21 at the lower end of said support. Said slides 18 are movable along the transverse ways 17 to bring together and separate the mold-sections, by a cam-plate 22 arranged at the rear of the carriage between the ways 13, and formed with upwardly converging grooves 23 which receive rearwardly-extending engaging arms 24 provided on the slides, said grooves widening gradually toward their upper ends. The engaging arms 24 extend through horizontal slots 25 formed in the carriage. Said cam-plate 22 is adjustable by a lever 26 arranged within the hollow standard 12, and pivoted at one end to said standard, and connected intermediate of its ends to the plate 22 by a pivot 27 extending through a slot 28 formed in the standard, and said cam-plate 22 is held in position by bolts 29.

As seen in Fig. 5 the mold-sections are detachably secured to the slides and are here illustrated as provided with stems 30 arranged in passages provided in the slides, and as adjustable by hollow screws 31 abutting against the ends of the stems 30. Set screws 32 hold the mold-sections and the adjusting screws in their proper positions. Scrapers 33 supported by the carriage are provided for removing any spilled metal from the upper faces of the mold-sections, and for also engaging the spur formed at the upper end of the shank of the button by the inlet orifice 5, and facilitating the removal of the shank with button-head attached, from the mold.

The reservoir 3 is inverted cone-shaped, and the lower end thereof is closed by a plug 34 in which the exit-port 7 is formed. This port is opened and closed by a plunger 35, actuated by means, hereinafter described, to open the port when the inlet orifice 5 of the mold is in registration with the exit port 7 of the reservoir. Said means operates to permit the return of the plunger to its normal position to close the port before the return of the mold to its starting position. As shown, the plunger 35 is carried by an arm 36 mounted on a rod 37 movable vertically through the hollow standard 12, said rod projecting into the hollow base 11. Said plunger 35 is also provided with suitable means for turning and preventing the same from becoming set, as a gear 38 meshing with a pinion 39 on the plunger, and having a handle 40 projecting beyond the periphery of the reservoir. The reservoir may be heated by any suitable means, here shown as a hollow ring-shaped burner 41 connected by a pipe 42 to a suitable fuel supply, not shown, and provided with jets 43 directed toward the surface of the reservoir. Preferably the reservoir is surrounded by a jacket 44 which also incloses the burner, and is provided with circumferential corrugations 45 for increasing the area of its surface.

The means for controlling the operation of the plunger, carriage, and support for the button-head, comprises a prime mover in the form of a rocking element or shaft 46, and cams 47, 48 and 49 mounted on said element for moving, respectively, the plunger, carriage and support for the button-head in one direction. A spring 50 acting on the rod 37 returns the plunger to its original position. The carriage returns by gravity to its original position, and the spring 20 returns the support for the button-head to its starting position. The rocking element 46, as here shown, is journaled in the base 11 and extends from front to rear thereof. The cams 47 and 48 are preferably scroll-cams fixed on the shaft 46 and rotatable therewith. The cam 49 is loosely mounted on the shaft 46 and is practically a crank having a roller for engaging the foot 21 of the support 1. A spring 51 encircling the shaft 46 and having one end connected to the cam 49, and its other end to said shaft transmits the motion from the shaft to the cam 49, when no work is being done by the cam 49 by reason of the carriage being moved upwardly by the cam 48. When the carriage has reached the limit of its upward movement and is being held in such position by the high surface 52 of the cam 48, the spring 51 is tensioned by further movement of the shaft 46 and raises the support 1 in its guide 16 against the spring 20. The shaft 46 is initially actuated by any suitable means in one direction, as a sprocket wheel 53, connected to a treadle, not shown, by a chain 54, and in the reverse direction by a spring 55 encircling said shaft and having one end connected to the base 11, and its other end to the shaft. When the shaft 46 is rocked in one direction by depressing the treadle, the spring 55 will be tensioned, so that the shaft 46 will be returned to its starting position by said spring as soon as pressure is removed from the sprocket wheel 53.

The return movement of the shaft by the spring 55 is practically instantaneous, so that the plunger 35 may return to close the exit port 7 of the reservoir before the mold has been moved by the carriage away from the reservoir. An unattached part 56 movable reciprocally in a guide 57 formed in the top of the base, transmits motion from the cam 48 to the carriage, said part having a lengthwise adjustment, here shown as effected by a movable shoulder or nut 58 at its upper end. Upon the return of the shaft 46 to its initial position, the roller 59 at the lower end of the part 56 is engaged by the radial face of the cam 48 and limits the movement of the shaft 46. The return of the shaft 46 to its original position under the influence of the spring 55 permits the cam 49 to return to its starting position under the influence of the spring 51 and thus permits the support 7 for the button-head to be withdrawn from the mold by the spring 20, leaving the shank with button-head attached supported by the mold. During the movement of the carriage by gravity, the mold-sections will be separated, as previously described, and the strippers 10 will remove the shank with button-head attached from the mold and permit the same to fall upon the chutes 59 by which they are conveyed to any suitable receptacle.

As will be understood, the parts of the machine move in a cycle or in regular sequence, and are operated from a single prime mover. Each part has a definite initial position, or position of rest, to which it returns, at the end of each complete cycle of operation. The prime mover is the shaft 46, rocked in one direction by pressure on a treadle and returned to its initial position by a spring 55. As described, the mold, or die, is formed of two sections, each carried by a slide 18 occupying, when unrestrained, its lowermost position, in which the die sections are held widely separated and out of registration with the reservoir outlet. The slides 18 are guided by the horizontal ways 17 on the carriage 15, which is vertically movable and is guided by the ways 13. The cam plate 22 is held in a fixed position on the front face of the standard 12 and directly in the rear of the carriage 15, and the groove or slot 23 thereof receives the arms, or projections 24, extending rearwardly from the slides and through the horizontal slot 25 in the carriage 15. On the forward rocking of the shaft 46, the cam 48 thereof, moves the carriage 15 upward toward the metal reservoir, and in this movement the projections 24 coöperate with the upper walls of the groove 23 and force the slides 18 toward each other, thus bringing the dies, or mold sections, together and in proper registration with the reservoir outlet. On the return movement of the shaft 46, the carriage 15 drops down and the projections 24 then coact with the lower walls of the groove 23 for forcing the slides 18 back to their initial positions and thereby separating the die, or mold sections, and moving the same out of registration with the reservoir outlet.

What I claim is:—

1. In a button-making machine, a support for a button-head, a mold for forming a shank on the button-head, a reservoir for supplying molten material to the mold, said parts being disposed in vertical alinement and with the mold interposed between the reservoir and support, and operating means for said parts, substantially as and for the purpose described.

2. In a button-making machine, the combination of three elements, a support for a button-head formed with a recess for receiving the shank of the button, a mold for forming the shank on the button-head, the mold having inlet and exit orifices, and a reservoir for supplying molten material to the mold, the reservoir having an exit port, the inlet and exit orifices of the mold serving to register, respectively, with the exit port of the reservoir and the recess of the button-head, and being normally out of registration therewith, and means for moving two of said elements relatively to the other element for effecting the registration of said orifices with said exit-port and said recess, substantially as and for the purpose set forth.

3. In a button-making machine, the combination of three elements, a support for a button-head formed with a recess for receiving the shank of the button, the support having means for holding the button with its recess presented upwardly, a mold for forming a shank on the button-head, the mold being disposed above the support and having inlet and exit orifices, respectively, in its upper and lower sides, a reservoir for supplying molten material to the mold, the reservoir being located above the mold and having an exit port, the inlet and exit orifices of the mold serving to register, respectively, with the exit port of the reservoir and the recess of the button-head, and being normally out of registration therewith, and means for moving the support for the button-head and the mold to bring the inlet and exit orifices of the mold into registration with said exit port and said recess, substantially as and for the purpose described.

4. In a button-making machine, a support for a button-head having means for frictionally holding the button-head, a mold for forming a shank on the button-head, one of the foregoing elements being movable relatively to the other into position to permit the formation of the shank on the button-head, and out of said position for removing the button-head with the shank attached from the support, a reservoir for supplying molten material to the mold, and a stripper for removing the shank with the button-head attached from the mold, substantially as and for the purpose described.

5. In a button-making machine, a support for a button-head formed with a recess for receiving the shank of the button, the support having a socket for holding the button-head with its recess presented outwardly, a mold for forming the shank on the button-head, the mold having an exit orifice serving to register with the recess of the button-head and being normally out of registration therewith, one of the foregoing elements being movable relatively to the other for bringing the recess of the button-head and the exit orifice into registration to permit the formation of the shank on the button-head, and out of its position assumed when said recess and said exit port are in registration, for removing the button-head with the shank attached from the support, a reservoir for supplying the molten material to the mold, and a stripper for removing the shank with the button-head attached from the mold, substantially as and for the purpose specified.

6. In a button-making machine, a support for a button-head having a detachable holder formed with a socket for receiving a button-head, a mold for forming a shank on the button-head, and a reservoir for supplying molten material to the mold, and operating means for said parts, substantially as and for the purpose set forth.

7. In a button-making machine, a support for a button comprising a main body formed with an opening, and a holder formed with a socket for receiving the button-head and with a stud for entering the opening of the main body, a mold for forming a shank on the button-head, and a reservoir for supplying molten material to the mold, and operating means for said parts, substantially as and for the purpose described.

8. In a button-making machine, a support for a button-head, a mold for forming a shank on the button-head, the mold consisting of two separable sections having engaging arms associated therewith, a reservoir for supplying molten material to the mold, and means for moving the sections of the mold relatively to each other, said means comprising a plate formed with converging grooves for receiving, respectively, the engaging arms associated with said sections, substantially as and for the purpose specified.

9. In a button-making machine, a support for a button-head, a mold for forming a shank on the button-head, the mold consisting of two separable sections having engaging arms associated therewith, a reservoir for supplying molten material to the mold, and means for moving the sections of the mold relatively to each other, said means comprising a plate formed with converging grooves for receiving, respectively, the engaging arms associated with said sections, said grooves widening as they converge, substantially as and for the purpose set forth.

10. In a button making machine, a support for a button-blank formed with a recess for receiving a button shank, a mold for simultaneously forming and setting the shank in the button-head, the mold having a cavity and inlet and exit orifices opening out through its upper and lower faces, and said mold comprising two separable sections, a reservoir for supplying molten material to the mold, and provided with an exit port, the inlet and exit ports of the mold serving to register, respectively, with the said port of the reservoir and the recess in the button-head, and means driven from a prime mover for moving the support for the button-head, and the mold sections, for registering the parts as described, and for automatically separating the mold sections, substantially as and for the purpose described.

11. In a button-making machine, a support for a button-head formed with a recess for receiving the shank of the button, a mold for forming the shank on the button-head, the mold having inlet and exit orifices on opposite sides thereof, and comprising two separable sections, slides for supporting said sections, the slides having engaging arms, a reservoir for supplying molten material to the mold, the reservoir having an exit port, the inlet and exit orifices of the mold serving to register, respectively, with the exit port of the reservoir and the recess of the button-head, and being normally out of registration therewith, means for moving the support for the button-head and the mold to bring said orifices into and out of registration, respectively, with the exit port and said recess, and means for moving the sections of the mold together when said orifices are registering with said exit port and said recess, and for separating said sections when said orifices and said exit port and recess are going out of register, said means comprising a fixed plate having converging grooves for receiving the engaging arms of said slides, substantially as and for the purpose specified.

12. In a button-making machine, a support for a button-head formed with a recess for receiving the shank of the button, a mold for forming the shank on the button-head, the mold having inlet and exit orifices on opposite sides thereof, and comprising two separable sections, slides for supporting said sections, the slides having engaging arms, a reservoir for supplying molten material to the mold, the reservoir having an exit port, the inlet and exit orifices of the mold serving to register, respectively, with the exit port of the reservoir and the recess of the button-head, and being normally out of registration therewith, means for moving the support for the button-head and the mold to bring said orifices into and out of registration, respectively, with said exit port and said recess, and means for moving the sections of the mold together when said orifices are registering with said exit port and said recess, and for separating said sections when said orifices and said exit port and recess are going out of register, said means comprising a fixed plate having converging grooves for receiving the engaging arms of said slides, and means for adjusting the plate relatively to the mold-sections, substantially as and for the purpose set forth.

13. In a button-making machine, a support for a button-head formed with a recess for receiving the shank of the button, a mold for forming the shank on the button-head, the mold having inlet and exit orifices on opposite sides thereof, and comprising two separable sections, slides for supporting said sections the slides having engaging arms, a reservoir for supplying molten material to the mold, the reservoir having an exit port, the inlet and exit orifices of the mold serving to register, respectively, with the exit port of the reservoir and the recess of the button-head, and being normally out of registration therewith, means for moving the support for the button-head and the mold to bring said orifices into and out of registration, respectively, with said exit port and said recess, and means for moving the sections of the mold together as said orifices are registering with said exit port and said recess, and for separating said sections when said orifices and said exit port and recess are going out of register, said means comprising a fixed plate having converging grooves for receiving the engaging arms of said slides, and means for adjusting the plate relatively to the mold-sections, the latter means comprising a lever pivoted at one end independently of the plate, and being pivoted to the plate intermediate of its ends, substantially as and for the purpose described.

14. In a button-making machine, a support for a button-head formed with a recess for receiving the shank of the button, a mold for forming the shank on the button-head, the mold having inlet and exit orifices on opposite sides thereof, and comprising two separable sections, slides for supporting said sections, the slides having engaging arms, a reservoir for supplying molten material to the mold, the reservoir having an exit port, the inlet and exit orifices of the mold serving to register, respectively, with the exit port of the reservoir and the recess of the button-head, and being normally out of registration therewith, means for moving the support for the button-head and the mold to bring said orifices into and out of registration, respectively, with said exit port and said recess, and for effecting the separation of the button-head with the shank attached from the support, a stripper for removing the shank with the button-head attached from the sections of the mold when separated, and means for moving the sections of the mold relatively to each other, substantially as and for the purpose specified.

15. In a button-making machine, the combination of a frame formed with a guide, a carriage movable along the guide, a support for a button-head, a mold for forming a shank on the button-head, the support for the button-head and the mold being supported by the carriage, a reservoir for supplying molten material to the mold, normally spaced apart from said support and mold, and means for moving the carriage along the guide to carry the support for the button-head and the mold toward and from the reservoir, substantially as and for the purpose set forth.

16. In a button-making machine, the combination of a frame formed with a guide, a carriage movable along the guide, a support for a button-head, a mold for forming a shank on the button-head, the support for the button-head and the mold being supported by the carriage, said support being movable relatively to the mold and carriage and normally spaced apart from the mold, a reservoir for supplying molten material to the mold, normally spaced apart from the mold, and means for moving the carriage along the guide to carry the mold toward and from the reservoir, and for moving the support for the button-head relatively to the mold and the carriage, substantially as and for the purpose described.

17. In a button-making machine, the combination of a frame formed with a guide, a carriage movable along the guide, a support for a button-head, a mold for forming a shank on the button-head, the support for the button-head and the mold being supported by the carriage, said support being movable relatively to the mold and carriage and normally spaced apart from the mold, a reservoir for supplying molten material to the mold, and means for moving the carriage along the guide to carry the mold and the support for the button-head toward the reservoir as one body, and for moving the support for the button-head toward and from the mold when the mold is in position to receive the molten material from the reservoir, substantially as and for the purpose specified.

18. In a button-making machine, the combination of a frame formed with a guide, a carriage movable along the guide, said carriage being also formed with a guide extending parallel to the first-mentioned guide, a support for a button-head, a mold for forming a shank on the button-head, the support for the button-head and the mold being supported by the carriage, and said support being movable in the second-mentioned guide, a reservoir for supplying molten material to the mold, and means for moving the carriage along the first-mentioned guide to carry the mold relatively to the reservoir into position to receive molten material therefrom, and for moving the support in the second-mentioned guide relatively to the mold to move the button-head thereon into and out of position assumed when a shank is being formed thereon, substantially as and for the purpose set forth.

19. In a button-making machine, the combination of a frame formed with a guide, a carriage movable along the guide, a support for a button-head formed with a recess for receiving the shank of the button, a mold for forming the shank on the button-head, said mold having inlet and exit orifices opening through opposite sides thereof, the support for the button-head and the mold being supported by the carriage, a reservoir for supplying molten material to the mold, the reservoir having an exit port, the inlet and exit orifices of the mold serving to register, respectively, with the exit port of the reservoir and the recess of the button-head, and being normally out of registration therewith, and means for moving the carriage along the guide to carry the mold relatively to the reservoir and bring the inlet orifice thereof into and out of registration with the exit port of the reservoir, and for moving the support for the button-head relatively to the mold to bring the recess thereof into and out of registration with the exit orifice of the mold, substantially as and for the purpose described.

20. In a button-making machine, the combination of a frame formed with a guide, a carriage movable along the guide, said carriage being formed with transverse ways, a support for a button-head, a mold for forming a shank on the button-head, the support for the button-head and the mold being supported by the carriage, and the mold comprising two separable sections, slides movable in the transverse ways, for supporting said sections, a reservoir for supplying molten material to the mold, means for moving the carriage to carry the mold as a body relatively to the reservoir into position to receive molten material therefrom, and for moving the support relatively to the mold to bring the button-head thereon into its position assumed when a shank is being formed thereon, and means for moving said slides toward and from each other to move the mold sections together when the mold is in position to receive the molten material, and to separate said sections when the mold is out of such position, substantially as and for the purpose specified.

21. In a button-making machine, the combination of a frame formed with a guide, a carriage movable along the guide, said carriage being formed with transverse ways, a support for a button-head, a mold for forming a shank on the button-head, the support for the button-head and the mold being supported by the carriage, and the mold comprising two separable sections, slides movable in the transverse ways, for supporting said sections, said slides having engaging arms, a reservoir for supplying molten material to the mold, means for moving the carriage to carry the mold as a body relatively to the reservoir into position to receive molten material therefrom, and for moving the support relatively to the mold to bring the button-head thereon into its position assumed when a shank is being formed thereon, and means for moving said slides toward each other to move the mold sections together when the mold is in position to receive the molten material, and to separate said sections when the mold is out of such position, said means comprising a plate fixed to the frame within the guide for the carriage and formed with converging grooves for receiving, respectively, said engaging arms, substantially as and for the purpose set forth.

22. In a button-making machine, the combination of a frame formed with a guide, a carriage movable along the guide, said carriage being formed with transverse ways, a support for a button-head, a mold for forming a shank on the button-head, the support for the button-head and the mold being supported by the carriage, and the mold comprising two separable sections, slides movable in the transverse ways for supporting said sections, said slides having engaging arms, a reservoir for supplying molten material to the mold, means for moving the carriage to carry the mold as a body relatively to the reservoir into position to receive molten material therefrom, and for moving the support relatively to the mold to bring the button-head thereon into its position assumed when the shank is being formed thereon, and means for moving said slides toward each other to move the mold sections together when the mold is in position to receive the molten material, and to separate said sections when the mold is out of such position, said means comprising a plate fixed to the frame within the guide for the carriage and formed with converging grooves for receiving, respectively, said engaging arms, and means for adjusting the plate lengthwise of the guide, substantially as and for the purpose described.

23. In a button-making machine, the combination of a frame formed with a guide, a carriage movable along the guide, said carriage being formed with transverse ways, a support for a button-head, a mold for forming a shank on the button-head, the support for the button-head and the mold being supported by the carriage, and the mold comprising two separable sections, slides movable in the transverse ways for supporting said sections, said slides having engaging arms, a reservoir for supplying molten material to the mold, means for moving the carriage to carry the mold as a body relatively to the reservoir into position to receive molten material therefrom, and for moving the support relatively to the mold to bring the button-head thereon into its position assumed when the shank is being formed thereon, and means for moving said slides toward each other to move the mold sections together when the mold is in position to receive the molten material, and to separate said sections when the mold is out of such position, said means comprising a plate fixed to the frame within the guide for the carriage and formed with converging grooves for receiving, respectively, said engaging arms, and means for adjusting the plate lengthwise of the guide comprising a lever pivoted at one end to the frame and intermediate of its ends to the plate, substantially as and for the purpose specified.

24. In a button-making machine, the combination of a frame formed with a guide, a carriage movable along the guide and formed with a guide arranged parallel to the direction of movement of the carriage and also with transverse ways, a support for a button-head movable in the second-mentioned guide, a mold for forming a shank on the button-head, the mold comprising two separable sections, slides movable in the transverse ways for supporting said sections, a reservoir for supplying molten material to the mold, means for moving the carriage to carry the mold as one body relatively to the reservoir into its position assumed when receiving molten material, and for moving the support in its guide to bring the button-head thereon into its position assumed when a shank is being formed thereon, and means for moving the slides toward each other to move the mold sections together when the mold is in position to receive molten material and to separate said sections when the mold is out of such position, substantially as and for the purpose set forth.

25. In a button making machine, a support for the button head, a mold comprising separable sections, a reservoir for supplying molten metal to the mold, and means for moving the sections of the mold toward each other and the mold toward the reservoir, said means comprising a rocking element, and means for moving it in reverse directions, substantially as and for the purpose described.

26. In a button making machine, a support for the button head, a mold comprising separable sections, a reservoir for supplying molten material to the mold and provided with a shiftable feed controlling plunger, and mechanism for shifting the plunger, moving the sections of the mold relatively to each other, and the mold relatively to the reservoir, and for shifting the button support, said means comprising a rocking element, a spring for moving it in one direction, and means for moving it in a reverse direction, substantially as and for the purpose specified.

27. In a button-making machine, a support for a button-head, a mold for forming a shank on the button-head, the mold having an inlet orifice, a reservoir for supplying molten material to the mold, the reservoir having an exit port, the inlet orifice of the mold serving to register with the exit port of the reservoir and being normally out of registration therewith, a plunger for opening and closing said port, and means for moving the mold toward the reservoir to bring the inlet orifice thereof into registration with said exit port, and for moving the plunger relatively to said port, said means comprising a rocking element, cams for controlling the movement of the mold and plunger, respectively, mounted on said element and fixed thereto, means for moving said element in one direction, and a spring for moving the same in the opposite direction, substantially as and for the purpose set forth.

28. In a button-making machine, a support for a button-head, a mold for forming a shank on the button-head, the support being movable relatively to the mold to bring the button-head into and out of its position assumed when a shank is being formed thereon, a reservoir for supplying molten material to the mold, the reservoir having an exit port, a plunger for opening and closing said port, and means for controlling the movement of the support for the button-head and said plunger, said means comprising a rocking element, a cam fixed on said element for controlling the movement of the plunger, a cam loosely mounted on said element for controlling the movement of the support, and a spring having one end connected to said element and its other end to the second-mentioned cam, substantially as and for the purpose described.

29. In a button-making machine, a support for a button-head, a mold for forming a shank on the button-head, a reservoir for supplying molten material to the mold, the mold and support being movable relatively to the reservoir as one body, and the support being movable relatively to the mold, means for controlling the movement of the mold and support comprising a rocking element, a cam fixed on said element for controlling the movement of the mold and support as one body, a cam loosely mounted on said element, and a spring having one end connected to said element and its other end to the second-mentioned cam, substantially as and for the purpose specified.

30. In a button-making machine, a support for a button-head formed with a recess for receiving the shank of the button, the support having a socket for holding the button-head with its recess presented outwardly, a mold for forming the shank on the button-head, the mold having inlet and exit orifices, a reservoir for supplying molten material to the mold, the reservoir having an exit port, the inlet and exit orifices of the mold serving to register, respectively, with the exit port of the reservoir and the recess of the mold and being normally out of registration therewith, a plunger for opening and closing said port, means for moving the mold and support as one body toward the reservoir to bring the inlet orifice of the mold into registration with the exit port, and for moving the plunger relatively to said port, and for also moving the support for the button-head relatively to the mold to bring the exit orifice of the mold and the recess of the button-head into registration, said means comprising a rocking element, cams fixed on said element for controlling the operation of the plunger and the mold, a cam loosely mounted on said element for controlling the operation of the support for the button-head, a spring having one end connected to the cam loosely mounted on said element and its other end to said element, means for actuating said element in one direction, and a spring for actuating the same in the opposite direction, substantially as and for the purpose described.

31. In a button-making machine, the combination of a frame formed with a guide, a carriage movable along the guide, said carriage being also formed with a guide extending parallel to the first-mentioned guide, a support for the button-head, a mold for forming the shank on the button-head, the support for the button-head and the mold being supported by the carriage, and said support being movable in the second-mentioned guide, a reservoir for supplying molten material to the mold, and means for moving the carriage to carry the mold relatively to the reservoir into position to receive molten material therefrom, and for moving the support in its guide relatively to the mold to bring the button-head thereon into its position assumed when a shank is being formed thereon, said means comprising a rocking element journaled in the frame, a cam fixed on said element for controlling the movement of the carriage, a cam loosely mounted on said element for controlling the movement of the support relatively to the carriage, a spring having one end connected to said element, and its other end to the cam loosely mounted on said element, and means for actuating said element in one direction, and a spring for actuating the same in the opposite direction, substantially as and for the purpose specified.

32. In a button-making machine, the combination of a frame formed with a guide, a carriage movable along the guide, a support for a button-head formed with a recess, and a mold for forming a shank on the button-head, said mold having inlet and exit orifices opening through opposite sides thereof, the support for the button-head and the mold being supported by the carriage, a reservoir having an exit port, the inlet and exit orifices of the mold serving to register, respectively, with the exit port of the reservoir and the recess of the button-head, and being normally out of registration therewith, a plunger for opening and closing said port, and means for moving the carriage along the guide to carry the mold relatively to the reservoir and bring the inlet orifice thereof into and out of registration with the exit port of the reservoir and for moving the support for the button-head relatively to the mold to bring the recess thereof into registration with the exit orifice of the mold, and for also moving the plunger relatively to said port, said means comprising a rocking element journaled in the frame, cams fixed on said element for controlling the movement of the carriage and said plunger, and a cam loosely mounted on said element for controlling the operation of the support, a spring having one end fixed to said element, and its other end to the cam loosely mounted on said element, and means for actuating the rocking element in opposite directions, substantially as and for the purpose specified.

33. In a button-making machine, a frame consisting of a hollow base, a hollow standard rising from the rear portion of the base, a bracket mounted on the top of said standard and overhanging the front portion of the base, the standard being formed with a vertical guide consisting of ways spaced apart, a carriage movable along the guide and formed with a vertical tubular guide, and also with transverse ways, the carriage being also formed with horizontal slots extending through its front and rear faces, a support for a button-head formed with a recess for receiving the shank of the button, a mold for forming the shank on the button-head of the mold having inlet and exit orifices on opposite sides thereof and comprising two separable sections, slides movable in the transverse ways of the carriage for supporting said sections, the slides being formed with engaging arms extending through the horizontal slots formed in the carriage, a reservoir for supplying molten material to the mold, the reservoir depending from the overhanging bracket and having an exit port, the inlet and exit orifices of the mold serving to register, respectively, with the exit port of the reservoir and the recess of the button-head, and being normally out of registration therewith, a plunger for opening and closing said port, a rod extending lengthwise of the standard and connected to the plunger, the lower end of said rod extending into the base, and means within the hollow base for controlling the movements of the carriage and of said support, and of the plunger, said means comprising a shaft journaled within the hollow base, cams on the shaft for controlling the operation of said plunger, carriage and said support, the cams for controlling the movement of the plunger and support engaging, respectively, the lower end of said rod, and the lower end of said support, a sliding unattached part interposed between the carriage and the cam for controlling the movement of the carriage, and means for operating the slides comprising a plate arranged on the front face of said standard and between said vertical ways, and formed with upwardly converging grooves for receiving the arms provided on the slides, substantially as and for the purpose set forth.

34. A device for casting button shanks into button blanks comprising a melting pot having an outlet, a valve for said outlet, a sectional die adapted to form a shank and having a gate adapted to register with said outlet, means for moving the die sections in opposite directions for setting said die in the casting position, means for supporting a socketed button blank underneath said die, and operating means for the parts, substantially as and for the purpose described.

35. A device for casting button shanks into button blanks comprising a melting pot having an outlet, a valve for said outlet, a sectional die adapted to form a shank and having a gate adapted to register with said outlet, means for simultaneously moving the die sections in different directions for setting said die in the casting position, a plunger adapted to support a socketed button blank underneath said die, and means for operating said parts, substantially as and for the purpose specified.

36. A machine for forming and applying metal shanks to buttons comprising a receptacle for molten metal having an outlet nozzle, a valve controlling the same, a pair of movable dies arranged in proximity to said nozzle and forming when together a shank cavity, a vertically movable button supporting plunger adapted to press a button against the under side of the dies to close said die cavity and a single operating means for closing the dies, and for operating the plunger and valve, substantially as and for the purpose set forth.

37. A machine for providing a button blank with a shank, said machine comprising in combination a receptacle for molten metal, said receptacle having an outlet, a sectional die for forming the shank, means for bringing the die sections together and in casting position with respect to said outlet, a support for the button blank, means for moving said support to bring the blank into casting position with respect to said die, and mechanical means for automatically moving the die from casting position and separating the die sections, substantially as and for the purpose described.

38. In a device for casting button shanks into button blanks, a melting pot having an outlet, a gate for said outlet, a sectional die adapted to form a shank and having an inlet adapted to register with said outlet, a plunger adapted to support a socketed button blank underneath the die, a treadle and connections therefrom for moving the die sections together to close the die and for operating the gate of said outlet, substantially as and for the purpose specified.

39. A device for casting button shanks into button blanks comprising a reservoir having an outlet, a valve for said outlet, a sectional die, a support for a socketed button-blank, a prime mover, and means controlled thereby for moving the said valve, die sections and blank support in a cycle and in predetermined sequence, substantially as and for the purpose set forth.

40. A machine for forming and setting a shank in a recessed button-blank which comprises in combination, a receptacle for molten metal having a suitable opening for the discharge of the metal therefrom by gravity, a die, or mold, located below the discharge opening of the receptacle and provided with a die cavity opening out through its upper and lower faces, means for moving the mold for alining the upper end of the cavity with the discharge opening of the receptacle, and a support movable toward and from the under face of the mold for pressing the button blank into contact with the latter and with the recess in the blank in registration with the die cavity opening in the bottom face of the mold, whereby the recess in the button blank will form an uninterrupted continuation of the mold cavity, substantially as and for the purpose described.

41. A machine for providing button blanks with shanks, which comprises means for simultaneously forming and setting the shank in the blank, and including a reservoir, a mold and a support for supporting the blank independently of the mold during the casting operation, said reservoir, mold and support, being disposed in vertical alinement during the casting operation, substantially as and for the purpose specified.

42. In a button making machine, a reservoir having an outlet port, a support for a button blank, a section mold, and means for automatically bringing the sections together in vertical alinement with the said port, and for automatically separating the sections as they move out of alinement with said port, substantially as and for the purpose set forth.

43. In a machine for simultaneously forming and setting a button shank in a button blank having a recess opening out through its under face, and in combination, a reservoir for holding a supply of molten material and provided with an exit port, a support located beneath the reservoir and movable toward and from the same, and provided with means for holding a button blank with its under face presented uppermost, and a mold movable in a zone between the said support and reservoir and provided with a cavity of the shape of the shank to be cast, said cavity having continuations forming ports opening out through the upper and lower faces of the mold, substantially as and for the purpose specified.

In testimony whereof, I have hereunto signed my name in the presence of two attesting witnesses, at Rochester, in the county of Monroe, in the State of New York, this 20th day of December, 1906.

EDGAR SHANTZ.

Witnesses:
GRACE E. WOODS,
F. B. CHILLSON.

---

Copies of this patent may be obtained for five cents each, by addressing the "Commissioner of Patents, Washington, D. C."